US012730027B2

(12) United States Patent
Ishii et al.

(10) Patent No.: US 12,730,027 B2
(45) Date of Patent: Sep. 8, 2026

(54) CHAMBER AND LEAK TESTER

(71) Applicant: YAMAHA FINE TECHNOLOGIES CO., LTD., Hamamatsu (JP)

(72) Inventors: Toru Ishii, Hamamatsu (JP); Minoru Yamamoto, Fukuroi (JP); Daisuke Homma, Hamamatsu (JP); Kosei Fujita, Hamamatsu (JP)

(73) Assignee: YAMAHA FINE TECHNOLOGIES CO., LTD., Hamamatsu (JP)

( * ) Notice: Subject to any disclaimer, the term of this patent is extended or adjusted under 35 U.S.C. 154(b) by 488 days.

(21) Appl. No.: 18/366,765

(22) Filed: Aug. 8, 2023

(65) Prior Publication Data

US 2024/0053216 A1 Feb. 15, 2024

(30) Foreign Application Priority Data

Aug. 9, 2022 (JP) ................................ 2022-127229

(51) Int. Cl.
*G01M 3/02* (2006.01)

(52) U.S. Cl.
CPC .................................... *G01M 3/02* (2013.01)

(58) Field of Classification Search
CPC .... G01M 3/02; G01M 3/3209; G01M 3/3281; G01M 3/20
See application file for complete search history.

(56) References Cited

U.S. PATENT DOCUMENTS 9,097,609 B1 * 8/2015 Kelley .................... G01M 3/32
2007/0119237 A1 * 5/2007 Kanematsu ........... G01M 3/229 73/40.7
2007/0142818 A1 * 6/2007 Webler ............... A61B 17/1204 604/509

FOREIGN PATENT DOCUMENTS

JP 2006226745 A 8/2006
JP 2007139456 A 6/2007
JP 2018028445 A 2/2018

OTHER PUBLICATIONS

Office Action issued in Japanese Patent Application No. 2022-127229 mailed Jun. 2, 2026. English translation of the Office Action has been provided from the JPO One Portal Dossier.

* cited by examiner

*Primary Examiner* — David Z Huang
(74) *Attorney, Agent, or Firm* — ROSSI, KIMMS & McDOWELL LLP

(57) ABSTRACT

An object of the present disclosure is to provide a chamber with which inspection conditions of a leak test performed on workpieces of different sizes can easily be managed. The chamber according to an aspect of the present disclosure is a chamber used in a leak tester, and includes: a main chamber for housing a workpiece; a sub-chamber that communicates with the main chamber; and a volume changing mechanism for changing the volume of the sub-chamber, wherein the volume changing mechanism changes the volume of the sub-chamber such that a total volume of a space on the outside of the workpiece in the main chamber and the sub-chamber remains constant with respect to workpieces of different sizes.

17 Claims, 6 Drawing Sheets

CHAMBER AND LEAK TESTER

BACKGROUND OF THE INVENTION

1. Field of the Invention

The present disclosure relates to a chamber and a leak tester.

2. Description of the Related Art

A known leak tester inspects a workpiece for gas leaks while the workpiece is housed in a chamber. A chamber capable of housing workpieces of different sizes has been proposed as the chamber (see Japanese Unexamined Patent Application Publication No. 2007-139456). It is stated in Japanese Unexamined Patent Application Publication No. 2007-139456 that the size of the chamber is set at dimensions that allow the workpiece of the largest size to be inserted.

SUMMARY OF THE INVENTION

The present inventors discovered that when workpieces of different sizes are housed in a chamber, the volume of the space housing the workpiece on the outside of the workpiece varies, leading to variation in the amount of gas leakage per unit time and thereby making it difficult to manage the inspection conditions.

The present disclosure has been designed on the basis of these circumstances, and an object thereof is to provide a chamber with which inspection conditions for workpieces of different sizes can easily be managed.

Note that Japanese Unexamined Patent Application Publication No. 2007-139456 describes reducing the volume of the space inside the chamber in accordance with the size of the workpiece so that by reducing the amount of surplus discharge from the chamber, the capacity of a vacuum pump can be reduced. However, Japanese Unexamined Patent Application Publication No. 2007-139456 does not address the problem of the present disclosure. Furthermore, according to the configuration described in Japanese Unexamined Patent Application Publication No. 2007-139456, even when it is possible to reduce the amount of surplus space inside the chamber, it is difficult to control the volume of the space housing the workpiece on the outside of the workpiece to remain constant with respect to workpieces of different sizes.

(1) A chamber according to an aspect of the present disclosure is a chamber used in a leak tester, and includes: a main chamber for housing a workpiece; a sub-chamber that communicates with the main chamber; and a volume changing mechanism for changing the volume of the sub-chamber, wherein the volume changing mechanism changes the volume of the sub-chamber such that a total volume of a space on the outside of the workpiece in the main chamber and the sub-chamber remains constant with respect to workpieces of different sizes.

(2) In (1), the sub-chamber preferably includes an opening that communicates with a leak detector.

(3) In (1) or (2), the volume changing mechanism preferably controls the volume of the sub-chamber on the basis of size data about the workpiece.

(4) In any of (1) to (3), the volume changing mechanism preferably includes a piston that advances and retreats within the sub-chamber.

(5) In (4), the volume changing mechanism preferably includes a numerical value control actuator for controlling the position of the piston.

(6) In (4) or (5), preferably, the sub-chamber includes a tubular part, and the piston is disposed in an airtight manner with respect to an inner peripheral surface of the tubular part, and advances and retreats in an axial direction of the tubular part.

(7) In any of (1) to (3), preferably, the sub-chamber includes one or a plurality of chambers that communicate with the main chamber, and the volume changing mechanism includes one or a plurality of valves that are capable of shutting off entry of a fluid into each of the one or plurality of chambers, respectively.

(8) In any of (1) to (7), the chamber preferably further includes a positioning mechanism for positioning the workpiece within the main chamber.

(9) A leak tester according to another aspect of the present disclosure includes the chamber according to any of (1) to (8).

(10) A leak tester according to a further aspect of the present disclosure includes the chamber of (2) and a leak detector that communicates with the sub-chamber.

The chamber according to one aspect of the present disclosure includes the sub-chamber used to change the volume, and therefore the total volume of the space on the outside of the workpiece in the main chamber and the sub-chamber can easily be controlled to a constant level by the volume changing mechanism. Hence, by using this chamber, the inspection conditions of a leak test performed on workpieces of different sizes can easily be managed.

DESCRIPTION OF THE PREFERRED EMBODIMENTS

Embodiments of the present disclosure will be described in detail below with appropriate reference to the figures. Note that the figures are schematic and may not correspond to actual dimensions, ratios, and so on.

First Embodiment

Chamber

Figure 1:
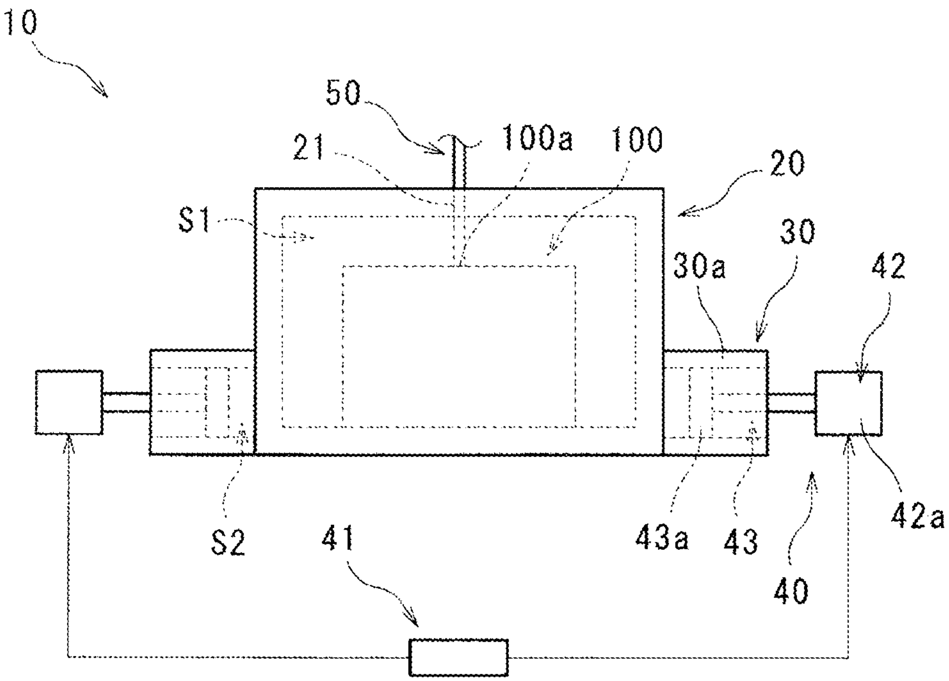
FIG. 1 is a schematic front view showing a chamber according to an embodiment of the present disclosure.

A chamber 10 of FIG. 1 is a chamber used in a leak tester. The chamber 10 includes a main chamber 20 for housing a workpiece 100, a sub-chamber 30 that communicates with the main chamber 20, and a volume changing mechanism 40 for changing the volume of the sub-chamber 30. The chamber 10 also includes a nozzle 50 disposed in the main chamber 20.

The workpiece 100 includes an opening 100*a*. The workpiece 100 is a hollow body, for example. The workpiece 100 is held inside the main chamber 20 in a state where the nozzle 50 is attached to the opening 100*a*. The chamber 10 is provided to allow the workpiece 100 to be inspected for leakage of a fluid such as a tracer gas that is sealed inside the workpiece 100 through the nozzle 50.

The volume changing mechanism 40 changes the volume of the sub-chamber 30 such that a total volume of a space on the outside of the workpiece 100 in the main chamber 20 and the sub-chamber 30 remains constant with respect to workpieces 100 of different sizes. To describe this in more detail, the volume changing mechanism 40 changes the volume of the sub-chamber 30 such that the volume of a void on the outside of the workpiece through which the fluid can pass in the main chamber 20 and the sub-chamber 30 remains constant regardless of the size of the workpiece 100.

By providing the chamber 10 with the sub-chamber 30 used to change the volume, the total volume of the space on the outside of the workpiece 100 in the main chamber 20 and the sub-chamber 30 can easily be controlled to a constant level by the volume changing mechanism 40. Hence, according to the chamber 10, a reference amount of the fluid that reaches a leak detector per unit time after leaking out from the workpiece 100 can be controlled to a constant level. In other words, according to the chamber 10, inspection conditions for workpieces 100 of different sizes can easily be unified. As a result, there is no need to set a leak amount threshold for each size of the workpiece 100. Moreover, according to the chamber 10, a cycle time for vacuum-pumping the interior of the chamber 10 can be made uniform. Therefore, by using the chamber 10, the inspection conditions of a leak test performed on workpieces 100 of different sizes can easily be managed.

Each of the constituent members of the chamber 10 will be described in detail below.

Main Chamber

The main chamber 20 has, in the interior thereof, a housing space S1 capable of housing the workpiece 100. The main chamber 20 includes two detachable members, for example. One or both of these members include a recess that forms the housing space S1 in a state where the members are tightly fitted to each other. In other words, the housing space S1 is an internal space that is formed in the interior of the two members by tightly fitting the two members to each other. The housing space S1 is formed in a size that allows the largest workpiece 100 envisaged as being housed in the main chamber 20 to be disposed therein, for example. The housing space S1 has a rectangular parallelepiped shape, for example.

The main chamber 20 is capable of housing workpieces 100 of different sizes in the housing space S1. The volume of the space on the outside of the workpiece in the housing space S1 is configured to vary on the basis of the size of the workpiece 100. In other words, the size of the housing space S1 remains constant, and therefore, when the volume of the workpiece 100 increases, the volume of the space on the outside of the workpiece decreases. Conversely, when the volume of the workpiece 100 decreases, the volume of the space on the outside of the workpiece increases.

The main chamber 20 includes a through hole 21 into which a nozzle 50 is inserted. The nozzle 50 is provided to be capable of advancing and retreating within the housing space S1 while inserted into the through hole 21. The workpiece 100 is positioned within the main chamber 20 so that on a plan view (when seen in a projection direction of the nozzle 50), the opening 100*a* and the nozzle 50 are aligned.

Figure 2:
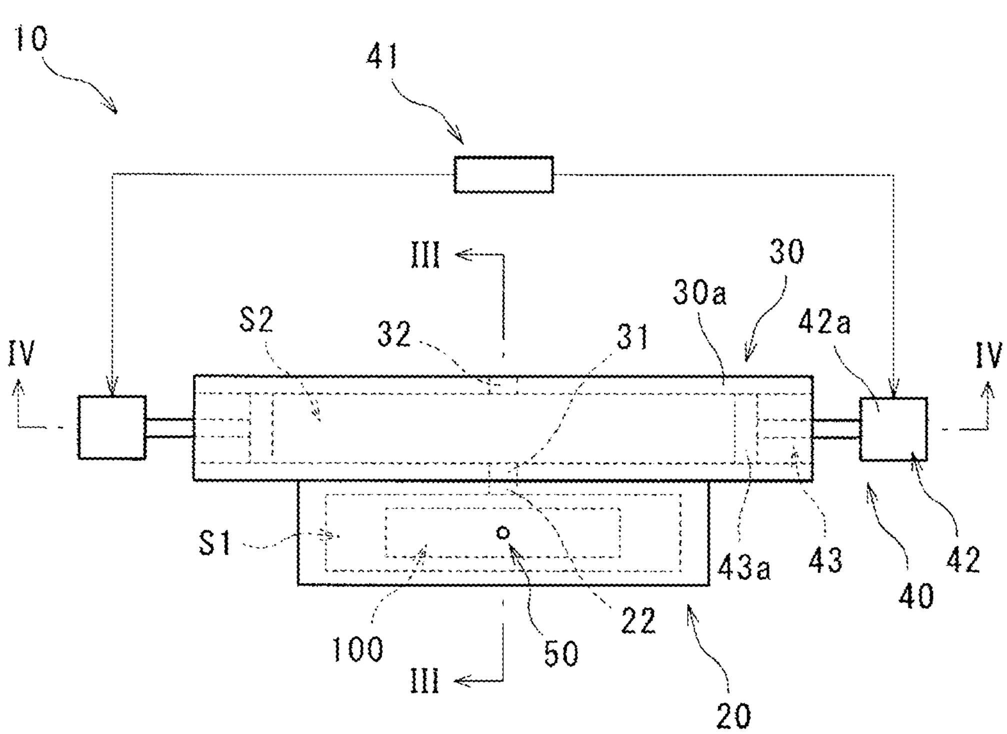
FIG. 2 is a schematic plan view of the chamber of FIG. 1.
Figure 3:
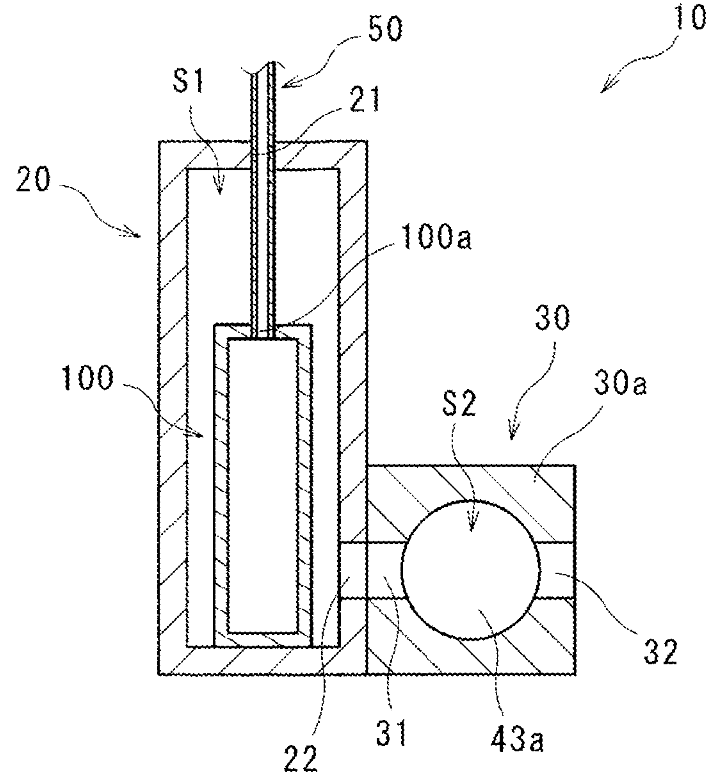
FIG. 3 is a sectional view of the chamber of FIG. 2, taken along a III-III line.

As shown in FIGS. 2 and 3, the main chamber 20 includes a first connecting passage 22 that communicates with an internal space (a volume adjustment space S2, to be described below) of the sub-chamber 30. The first connecting passage 22 is formed as a flow passage for the fluid during the leak test.

Sub-Chamber

The sub-chamber 30 is connected to the main chamber 20 such that respective wall surfaces thereof contact each other. The sub-chamber 30 includes the volume adjustment space S2, which communicates with the housing space S1 housing the workpiece 100 and is independent of the housing space S1. The volume adjustment space S2 is provided such that the volume thereof is changed by the volume changing mechanism 40. A maximum value of the amount of change in the volume of the volume adjustment space S2 can be set within a range at which the amount of change in the volume on the outside of the workpiece 100 in the housing space S1 can be absorbed when workpieces 100 of different sizes are housed in the housing space S1. More specifically, the maximum volume of the volume adjustment space S2 can be set at or above a difference between the volume of the largest workpiece 100 and the volume of the smallest workpiece 100 envisaged as being housed in the main chamber 20.

As shown in FIGS. 2 and 3, the sub-chamber 30 includes a second connecting passage 31 that communicates with the housing space S1 of the main chamber 20. The first connecting passage 22 and the second connecting passage 31 are directly connected. The second connecting passage 31 is formed as a flow passage for the fluid during the leak test. In other words, the housing space S1 of the main chamber 20 and the volume adjustment space S2 of the sub-chamber 30 are connected by a flow passage that includes the first connecting passage 22 and the second connecting passage 31. The flow passage is provided so that communication between the housing space S1 and the volume adjustment space S2 is maintained during the leak test performed on the workpiece 100.

The volume adjustment space S2 is provided as a sub-space for adjusting the overall volume of the chamber 10 such that a total volume (a volume including the housing space S1, the volume adjustment space S2, and the flow passage) of the space on the outside of the workpiece 100 in the main chamber 20 and the sub-chamber 30 remains constant regardless of the size of the workpiece 100.

The sub-chamber 30 includes an opening 32 that communicates with the leak detector. In other words, the volume adjustment space S2 of the sub-chamber 30 forms a part of a flow passage through which the fluid that leaks out from the workpiece 100 reaches the leak detector. According to this configuration, the inspection conditions can easily be unified for workpieces 100 of different sizes. Note that the volume adjustment space S2 is configured as a hermetic space in which the fluid is prevented from leaking out from any part other than the second connecting passage 31 and the opening 32.

The sub-chamber 30 includes a tubular part. The tubular part may be provided in a part of the sub-chamber 30, or the entire sub-chamber 30 may be formed as the tubular part. In the chamber 10 of FIG. 1, the entire sub-chamber 30 is formed as the tubular part 30*a*.

Figure 4:
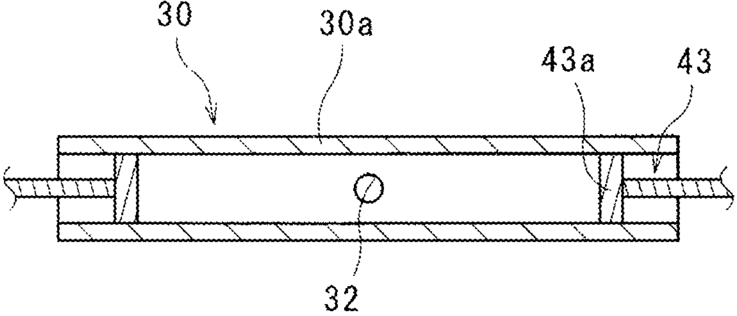
FIG. 4 is a sectional view of the chamber of FIG. 2, taken along a IV-IV line.

As shown in FIGS. 2 and 4, the internal space of the tubular part 30*a* is sealed by a piston 43, to be described below, that forms a part of the volume changing mechanism 40. According to this configuration, the tubular part 30*a* is provided as a volume adjustment unit for adjusting the volume of the volume adjustment space S2. In the chamber 10 of FIG. 1, the entire sub-chamber 30 is formed as the tubular part 30*a*, and end portions on the two sides of the tubular part 30*a* are respectively sealed by the piston 43.

Volume Changing Mechanism

The volume changing mechanism 40 controls the volume of the sub-chamber 30 such that variation in the volume of the workpiece 100 and variation in the volume of the volume adjustment space S2 correspond to each other with respect to workpieces 100 of different sizes. The volume changing mechanism 40 controls the volume of the sub-chamber 30 on the basis of size data about the workpiece 100. More specifically, the volume changing mechanism 40 includes a calculation unit 41 that calculates a target volume of the sub-chamber 30 when the workpiece 100 is housed in the housing space S1, and a control unit 42 that controls the volume of the sub-chamber 30 on the basis of the calculation result acquired by the calculation unit 41. There are no specific limitations on the procedure for inputting the size data of the workpiece 100 into the calculation unit 41. For example, the size data of the workpiece 100 may be input by an operator or input by reading a reading code such as a two-dimensional bar code attached to the workpiece 100. The calculation unit 41 is configured to include a CPU (central processing unit), for example. By configuring the chamber 10 such that the volume of the sub-chamber 30 is controlled on the basis of the size data of the workpiece 100, the volume of the sub-chamber 30 can easily be adjusted such that the total volume of the space on the outside of the workpiece 100 in the main chamber 20 and the sub-chamber 30 remains constant with respect to workpieces 100 of various sizes.

The volume changing mechanism 40 includes the piston 43 that advances and retreats within the sub-chamber 30. By including the piston 43 and adjusting the projection amount of the piston 43, the volume changing mechanism 40 can easily control the overall volume of the chamber 10. More specifically, by reducing the projection amount of the piston 43 when the size of the workpiece 100 is large and increasing the projection amount of the piston 43 when the size of the workpiece 100 is small, the overall volume of the chamber 10 can easily be controlled such that the total volume of the space on the outside of the workpiece 100 in the main chamber 20 and the sub-chamber 30 remains constant. Note that the number of pistons 43 disposed in the sub-chamber 30 can be set on the basis of the number of tubular parts 30*a*, the arrangement thereof, and so on. When a plurality of pistons 43 are disposed in the sub-chamber 30, "the projection amount of the piston" refers to the total projection amount of all of the pistons.

A sealing portion 43*a* disposed in an airtight manner with respect to an inner peripheral surface of the tubular part 30*a* is provided on a tip end portion of the piston 43. The sealing portion 43*a* is plate-shaped, for example. The piston 43 advances and retreats in an axial direction of the tubular part 30*a* in a state where the sealing portion 43*a* is disposed in an airtight manner relative to the inner peripheral surface of the tubular part 30*a*. According to this configuration, the volume of the volume adjustment space S2 can be adjusted easily and reliably.

The volume changing mechanism 40 includes a numerical value control actuator 42*a* for controlling the position of the piston 43. The numerical value control actuator 42*a* is included in the control unit 42 described above. By using the numerical value control actuator 42*a* to control the position of the piston 43 in this manner, the overall volume of the chamber 10 can be controlled easily and reliably.

Second Embodiment

Leak Tester

Figure 5:
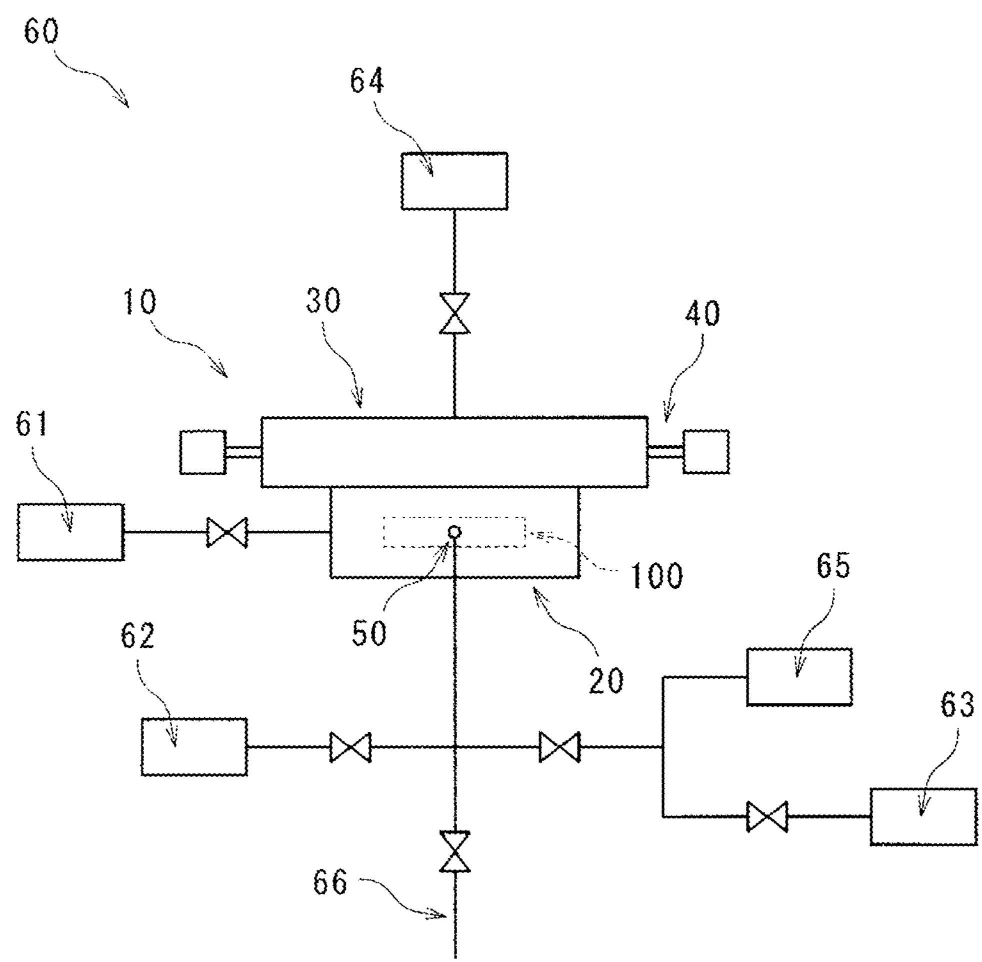
FIG. 5 is a schematic view showing a leak tester including the chamber of FIG. 1.

A leak tester 60 of FIG. 5 includes the chamber 10. There are no particular limitations on the specific configurations of the leak tester 60 other than the chamber 10. For example, the leak tester 60 can be configured to include: the chamber 10; a first vacuum pump 61 for depressurizing the housing space S1 and the volume adjustment space S2 formed in the chamber 10; a second vacuum pump 62 for depressurizing the internal space of the workpiece 100 housed in the housing space S1 through the nozzle 50; a tracer gas supply unit 63 which, following vacuum pumping by the second vacuum pump 62, seals a tracer gas in the internal space of the workpiece 100 through the nozzle 50; a leak detector 64 for detecting tracer gas that has leaked out from the workpiece 100; a tracer gas collection unit 65 for collecting the tracer gas through the nozzle 50 after performing the leak test on the workpiece 100; and an atmosphere opening unit 66 for returning the interior of the workpiece 100 to the atmosphere through the nozzle 50 after performing the leak test on the workpiece 100.

In the leak tester 60, the first vacuum pump 61 may communicate with either of the main chamber 20 and the sub-chamber 30, and this may be selected on the basis of the layout and other conditions. Further, although not shown in the figures, when a chamber atmosphere returning unit, a chamber nitrogen gas purging unit, and/or the like are/is provided, these members may be disposed in either the main chamber 20 or the sub-chamber 30.

In the leak tester 60, the leak detector 64 may communicate with the sub-chamber 30. More specifically, the leak detector 64 may communicate with the aforementioned opening 32 provided in the sub-chamber 30. Alternatively, the leak detector 64 may be provided so as to communicate with the main chamber 20. The communication destination of the leak detector 64 can be selected on the basis of the layout and other conditions.

There are no specific limitations on the tracer gas, but examples thereof include hydrogen, helium, a mixed gas containing these gases, and so on.

Since the leak tester 60 includes the chamber 10, the inspection conditions of the leak test performed on workpieces 100 of different sizes can be managed easily.

Moreover, the leak tester 60 includes the leak detector 64 that communicates with the sub-chamber 30, and therefore the volume of the flow passage for the tracer gas that leaks out from the workpiece 100 can be controlled to a constant level regardless of the size of the workpiece 100. As a result, the inspection conditions can be unified even more reliably with respect to workpieces 100 of different sizes.

Leak Test Procedures

Next, an example of a leak test method using the leak tester 60 of FIG. 5 will be described. This leak test method includes controlling the volume of the sub-chamber 30 on the basis of the size data of the workpiece 100 (control step), disposing the workpiece 100 inside the housing space S1 (placement step), attaching the nozzle 50 to the opening 100*a* of the workpiece 100 (attachment step), vacuum-pumping the interior of the chamber 10 (first vacuum pumping step), vacuum-pumping the interior of the workpiece 100 (second vacuum pumping step), sealing the tracer gas in the internal space of the workpiece 100 (sealing step), and inspecting for tracer gas leaks using the leak detector 64

(inspection step). The leak test method also includes collecting tracer gas existing in the internal space of the workpiece 100 following the inspection performed by the leak detector 64 (collection step), switching the internal space of the workpiece 100 back to the atmosphere (atmosphere replacement step), opening the interior of the chamber 10 to the atmosphere (atmosphere opening step), removing the nozzle 50 from the opening 100*a* of the workpiece 100 (nozzle removal step), and extracting the workpiece 100 from the housing space S1 (extraction step).

Control Step

The control step can be performed by the volume changing mechanism 40 described above. In the control step, the volume of the sub-chamber 30 is controlled on the basis of the size data of the workpiece. In the control step, by controlling the projection amount of the piston 43 that advances and retreats within the sub-chamber 30, the volume of the sub-chamber 30 is changed such that the total volume of the space on the outside of the workpiece 100 in the main chamber 20 and the sub-chamber 30 remains constant regardless of the size of the workpiece 100. In the control step, the position of the piston 43 is preferably controlled by the numerical value control actuator 42*a*.

Note that in this leak test method, the control step can be performed after the placement step. Furthermore, the control step may be performed when the size of the workpiece 100 is changed, and when workpieces 100 of the same size are inspected continuously, the control step may be omitted.

Third Embodiment

Figure 6:
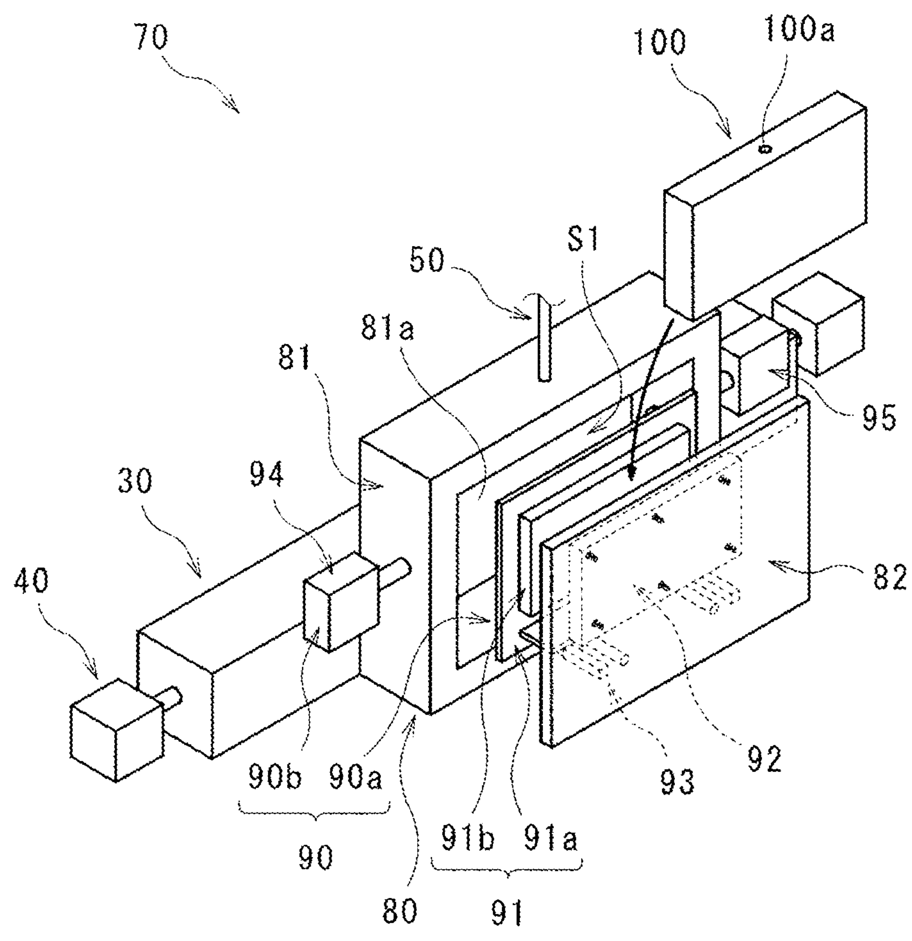
FIG. 6 is a schematic perspective view showing a chamber according to a different embodiment from that of the chamber of FIG. 1.

Referring to FIG. 6, a modified example of the chamber 10 of FIG. 1 will be described. A chamber 70 of FIG. 6 is a chamber used in a leak tester. The chamber 70 includes a main chamber 80 for housing the workpiece 100, the sub-chamber 30 that communicates with the main chamber 80, the volume changing mechanism 40 for changing the volume of the sub-chamber 30, and the nozzle 50, which is disposed in the main chamber 80. The chamber 70 also includes a positioning mechanism 90 for positioning the workpiece 100 within the main chamber 80. The positioning mechanism 90 is partially disposed in the housing space S1.

The volume changing mechanism 40 changes the volume of the sub-chamber 30 such that the total volume of the space on the outside of the workpiece 100 in the main chamber 80 and the sub-chamber 30 remains constant with respect to workpieces 100 of different sizes. Note that in the chamber 70, the positioning mechanism 90 is partially disposed in the housing space S1. The volume of the positioning mechanism 90 that is disposed in the housing space S1 can be varied in accordance with the size of the workpiece 100. In this case, the wording "the total volume of the space on the outside of the workpiece in the main chamber and the sub-chamber remains constant" may mean that the volume of the space in the main chamber and the sub-chamber excluding the workpiece remains constant, but preferably means that, excluding the workpiece and the positioning mechanism disposed in the main chamber, the volume of the space in the main chamber and the sub-chamber remains constant.

In the chamber 70, the positioning mechanism 90 is disposed in the housing space S1, and therefore the volume of the space on the outside of the workpiece in the housing space S1 is limited by the positioning mechanism 90. Likewise with this configuration, the chamber 70 includes the sub-chamber 30 used for changing the volume, and therefore the total volume of the space on the outside of the workpiece 100 in the main chamber 80 and the sub-chamber 30 can easily be controlled to a constant level by the volume changing mechanism 40.

Apart from the feature in which the workpiece 100 can be positioned within the main chamber 80 by the positioning mechanism 90, the chamber 70 may be configured similarly to the chamber 10 of FIG. 1. Hence, only the positioning mechanism 90 and configurations of the main chamber 80 that are determined in relation to the positioning mechanism 90 will be described below.

Main Chamber

The main chamber 80 includes: a first member 81 having a recess 81*a* that forms the housing space S1 for the workpiece 100; and a second member 82 capable of closing the open end of the recess 81*a*. The second member 82 is a lid body that defines the housing space S1 within the main chamber 80.

Positioning Mechanism

The positioning mechanism 90 positions the workpiece 100 in a desired position within the housing space S1. The positioning mechanism 90 includes a first positioning mechanism 90*a* for positioning the workpiece 100 in a depth direction of the recess 81*a*, and a second positioning mechanism 90*b* for positioning the workpiece 100 in a direction perpendicular to the depth direction of the recess 81*a*.

The first positioning mechanism 90*a* includes a spacer plate 91 and a pressing body 92 that are capable of sandwiching the workpiece 100 from the respective sides of the workpiece 100. The first positioning mechanism 90*a* also includes a connecting portion 93 for connecting the spacer plate 91 to the pressing body 92. The spacer plate 91 includes a body 91*a* disposed on a side facing a bottom surface of the recess 81*a*, and an auxiliary portion 91*b* that is laminated onto the body 91*a* so as to face the workpiece 100. The pressing body 92 is disposed on an inner surface of the second member 82. The spacer plate 91 is arranged at an interval relative to the pressing body 92 so as to face the pressing body 92 with the workpiece 100 sandwiched therebetween. The first positioning mechanism 90*a* is provided such that the workpiece 100 is fixed between the spacer plate 91 and the pressing body 92 in a state where the spacer plate 91 is supported by the bottom surface of the recess 81*a*, for example.

The second positioning mechanism 90*b* includes a first moving body 94 that projects into the housing space S1 and supports the workpiece 100 in a predetermined position in a projection direction of the first moving body 94, and a second moving body 95 that projects into the housing space S1 so as to face the first moving body 94 and presses the workpiece 100 toward the side of the first moving body 94. The first moving body 94 and the second moving body 95 project in a direction perpendicular to the depth direction of the recess 81*a*. The first moving body 94 and the second moving body 95 respectively penetrate the first member 81. The second positioning mechanism 90*b* is provided so as to sandwich the workpiece 100 from both sides by causing the second moving body 95 to project such that the workpiece 100 can be sandwiched between the first moving body 94 and the second moving body 95 in a state where the projection length of the first moving body 94, for example, has been controlled.

By providing the chamber 70 with the positioning mechanism 90, the inspection conditions of the leak test performed on workpieces 100 of different sizes can be managed easily while positioning the workpiece 100 within the housing space S1 easily and reliably.

OTHER EMBODIMENTS

The configuration of the present invention is not limited to the embodiments described above. Accordingly, in the embodiments described above, constituent elements of the respective parts of the embodiments may be omitted, replaced, or added to on the basis of the disclosure in the present specification and common technical knowledge, and all such modifications are to be interpreted as belonging to the scope of the present invention.

The specific configurations of the main chamber and the sub-chamber are not limited to the configurations described in the embodiments. For example, the sub-chamber does not have to include the tubular part described above.

As long as the sub-chamber communicates with the main chamber, there are no particular limitations on the specific arrangement thereof. For example, the sub-chamber can be configured so as not to have an opening that communicates with the leak detector. Note, however, that the sub-chamber is preferably arranged on the flow passage between the main chamber and the leak detector.

In the embodiments described above, the main chamber and the sub-chamber are connected such that the wall surfaces thereof contact each other. By connecting the main chamber and the sub-chamber of the chamber in this manner, the flow passage between the housing space provided in the main chamber and the volume adjustment space provided in the sub-chamber can be shortened, enabling a reduction in the volume of the space required for the inspection. As a result, the inspection conditions can easily be managed with respect to workpieces of different sizes, and moreover, the inspection time, including the vacuum-pumping time, can easily be shortened, the inspection accuracy can easily be improved, and so on. When the main chamber and the sub-chamber are connected, the sub-chamber may be provided so as to be either detachable or non-detachable from the main chamber. As a configuration in which the sub-chamber is not detachable from the main chamber, the sub-chamber may be provided integrally with a constituent member of the main chamber, for example.

Alternatively, the chamber may employ a configuration in which the first connecting passage provided in the main chamber and the second connecting passage provided in the sub-chamber are connected by piping or the like. In this case, the main chamber and the sub-chamber can be disposed apart from each other.

The specific configuration of the volume changing mechanism is not limited to the configuration described in the above embodiments. For example, the volume changing mechanism does not have to be provided such that the volume of the sub-chamber is adjusted in accordance with the projection amount of the piston. For example, it is possible to employ a configuration in which the sub-chamber includes one or a plurality of chambers that communicate with the main chamber, and the volume changing mechanism includes one or a plurality of valves that are capable of shutting off entry of the fluid into each of the one or plurality of chambers, respectively. When the sub-chamber is provided with a plurality of chambers, the chambers may be partitioned within a single casing, for example, or may be provided separately. When the plurality of chambers are provided separately, the combined plurality of chambers constitute the sub-chamber. According to this configuration, the overall volume of the sub-chamber can be changed in steps by opening and closing the valves of the respective chambers. The respective chambers may be constituted by tanks, for example. Further, the plurality of chambers may have the same volume, but from the viewpoint of facilitating changing the volume of the sub-chamber finely and in a large number of stages, the volumes are preferably different.

As described above, the position of the piston is preferably controlled by the numerical value control actuator. However, the mechanism for controlling the position of the piston is not limited.

When the chamber is provided with the positioning mechanism described above, there are no particular limitations on the specific configuration of the positioning mechanism.

The leak tester may be configured as a device that uses a fluid other than a gas.

As described above, the chamber according to one aspect of the present disclosure is suitable for managing the inspection conditions of a leak test performed on workpieces of different sizes.

What is claimed is:

1. A chamber used in a leak tester, the chamber comprising:

a main chamber for housing a workpiece;

a sub-chamber that communicates with the main chamber and includes an opening that communicates with a leak detector; and a volume changing mechanism for changing a volume of the sub-chamber, wherein the volume changing mechanism changes the volume of the sub-chamber such that a total volume of a space on the outside of the workpiece in the main chamber and the volume of the sub-chamber remains constant with respect to workpieces of different sizes.

2. The chamber according to claim 1, wherein the volume changing mechanism controls the volume of the sub-chamber on the basis of size data about the workpiece.

3. The chamber according to claim 1, wherein the volume changing mechanism includes a piston that advances and retreats within the sub-chamber to adjust the volume of the sub-chamber.

4. The chamber according to claim 3, wherein the volume changing mechanism includes a numerical value control actuator for controlling a position of the piston.

5. The chamber according to claim 3, wherein the sub-chamber includes a tubular part, and wherein the piston is disposed in an airtight manner with respect to an inner peripheral surface of the tubular part, and advances and retreats in an axial direction of the tubular part.

6. The chamber according to claim 1, wherein the sub-chamber includes one or more chambers that communicate with the main chamber, and wherein the volume changing mechanism includes one or more valves that control entry of a fluid into each of the one or more chambers, respectively.

7. The chamber according to claim 1, further comprising a positioning mechanism for positioning the workpiece within the main chamber.

8. A leak tester comprising a chamber, the chamber including:

a main chamber for housing a workpiece;

a sub-chamber that communicates with the main chamber; and a volume changing mechanism for changing a volume of the sub-chamber, the volume changing mechanism including a calculation unit configured to calculate a target volume of the sub-chamber based on size data about the workpiece, and a control unit configured to control the volume of the sub-chamber based on a calculation result acquired by the calculation unit, wherein the volume changing mechanism changes the volume of the sub-chamber such that a total volume of a space on the outside of the workpiece in the main chamber and the volume of the sub-chamber remains constant with respect to workpieces of different sizes.

9. The chamber according to claim 8, wherein the sub-chamber includes an opening that communicates with a leak detector.

10. A leak tester comprising:

a chamber, the chamber including:

a main chamber for housing a workpiece;

a sub-chamber that communicates with the main chamber; and a volume changing mechanism for changing a volume of the sub-chamber, wherein the volume changing mechanism changes the volume of the sub-chamber such that a total volume of a space on the outside of the workpiece in the main chamber and the volume of the sub-chamber remains constant with respect to workpieces of different sizes; and a leak detector that communicates with the sub-chamber via an opening in the sub-chamber.

11. A chamber used in a leak tester, the chamber comprising:

a main chamber for housing a workpiece;

a sub-chamber that communicates with the main chamber; and a volume changing mechanism for changing a volume of the sub-chamber, the volume changing mechanism including a calculation unit configured to calculate a target volume of the sub-chamber based on size data about the workpiece, and a control unit configured to control the volume of the sub-chamber based on a calculation result acquired by the calculation unit, wherein the volume changing mechanism changes the volume of the sub-chamber such that a total volume of a space on the outside of the workpiece in the main chamber and the volume of the sub-chamber remains constant with respect to workpieces of different sizes.

12. The chamber according to claim 11, wherein the sub-chamber includes an opening that communicates with a leak detector.

13. The chamber according to claim 11, wherein the volume changing mechanism includes a piston that advances and retreats within the sub-chamber to adjust the volume of the sub-chamber.

14. The chamber according to claim 13, wherein the volume changing mechanism includes a numerical value control actuator for controlling a position of the piston.

15. The chamber according to claim 13, wherein the sub-chamber includes a tubular part, and wherein the piston is disposed in an airtight manner with respect to an inner peripheral surface of the tubular part, and advances and retreats in an axial direction of the tubular part.

16. The chamber according to claim 11, wherein the sub-chamber includes one or more chambers that communicate with the main chamber, and wherein the volume changing mechanism includes one or more valves that control entry of a fluid into each of the one or more chambers, respectively.

17. The chamber according to claim 11, further comprising a positioning mechanism for positioning the workpiece within the main chamber.

* * * * *